(12) United States Patent
Chen et al.

(10) Patent No.: US 10,955,616 B2
(45) Date of Patent: Mar. 23, 2021

(54) DEMOUNTABLE CONNECTION OF AN OPTICAL CONNECTOR AND AN OPTICAL BENCH BASED CONNECTOR USING AN ALIGNMENT COUPLER

(71) Applicant: NANOPRECISION PRODUCTS, INC., Camarillo, CA (US)

(72) Inventors: Yang Chen, Thousand Oaks, CA (US); Robert Ryan Vallance, Newbury Park, CA (US)

(73) Assignee: CUDOQUANTA FLORIDA, INC., Sarasota, FL (US)

( * ) Notice: Subject to any disclaimer, the term of this patent is extended or adjusted under 35 U.S.C. 154(b) by 0 days.

(21) Appl. No.: 16/662,021

(22) Filed: Oct. 23, 2019

(65) Prior Publication Data
US 2020/0124804 A1 Apr. 23, 2020

Related U.S. Application Data

(60) Provisional application No. 62/749,616, filed on Oct. 23, 2018, provisional application No. 62/749,618, filed on Oct. 23, 2018.

(51) Int. Cl.
*G02B 6/26* (2006.01)
*G02B 6/38* (2006.01)

(52) U.S. Cl.
CPC ............. *G02B 6/26* (2013.01); *G02B 6/3839* (2013.01); *G02B 6/3882* (2013.01); *G02B 6/3897* (2013.01)

(58) Field of Classification Search
CPC ................................ G02B 6/26; G02B 6/3839
See application file for complete search history.

(56) References Cited

U.S. PATENT DOCUMENTS 6,374,004 B1 4/2002 Han et al.
6,422,761 B1 7/2002 Naghski et al.
(Continued)

OTHER PUBLICATIONS

International Search Report of Counterpart PCT International Application No. PCT/US2019/057744.

*Primary Examiner* — Sung H Pak
(74) *Attorney, Agent, or Firm* — Liu & Liu

(57) ABSTRACT

An alignment coupler is provided to facilitate active alignment of the optical bench to the optical connector. The optical bench and the coupler together form an optical bench based connector. A method of demountable connection of an optical connector to an optical bench based connector, comprising: providing a coupler, wherein the coupler has an opening sized to receive an optical bench with clearance for relative movement between the optical bench and the coupler to facilitate alignment, and wherein the coupler is provided with a passive alignment structure structured to demountably couple to the connector; demountably coupling the coupler to the connector; placing the optical bench in the opening of the coupler; actively aligning the optical path between the optical bench and the connector to reach a desired optical alignment between the optical bench and the connector, by adjusting a position of the optical bench within the clearance of the opening of the coupler; fixing the position of the optical bench relative to the coupler at the desired optical alignment, whereby the optical bench is optically aligned to the connector using the coupler, thereby allowing subsequent demountable coupling of the optical bench to the connector by demountable coupling of the coupler.

20 Claims, 7 Drawing Sheets

(56) References Cited

U.S. PATENT DOCUMENTS

| | | | |
|---|---|---|---|
| 6,736,553 B1* | 5/2004 | Stiehl | G02B 6/4246 |
| | | | 385/89 |
| 9,435,968 B1* | 9/2016 | Nishimura | G02B 6/4267 |
| 9,581,776 B1 | 2/2017 | Lee et al. | |
| 10,025,043 B2* | 7/2018 | Vallance | G02B 6/422 |
| 10,361,787 B2* | 7/2019 | Mack | H05K 13/0404 |
| 2005/0123246 A1* | 6/2005 | Morse | H01S 3/06754 |
| | | | 385/53 |
| 2010/0074581 A1* | 3/2010 | Tanobe | G02B 6/4201 |
| | | | 385/93 |
| 2015/0037044 A1* | 2/2015 | Peterson | G02B 6/4292 |
| | | | 398/135 |
| 2016/0202420 A1* | 7/2016 | Paquet | G02B 6/30 |
| | | | 385/33 |
| 2017/0363821 A1 | 12/2017 | Giziewicz et al. | |

* cited by examiner

DEMOUNTABLE CONNECTION OF AN OPTICAL CONNECTOR AND AN OPTICAL BENCH BASED CONNECTOR USING AN ALIGNMENT COUPLER

PRIORITY CLAIM

This application claims the priorities of (a) U.S. Provisional Patent Application No. 62/749,616 filed on Oct. 23, 2018; and (b) U.S. Provisional Patent Application No. 62/749,618 filed on Oct. 23, 2018. These applications are fully incorporated by reference as if fully set forth herein. All publications noted below are fully incorporated by reference as if fully set forth herein.

BACKGROUND OF THE INVENTION

1. Field of the Invention

The present invention relates to a demountable optical connection, and more particularly to the optical connection of an optical connector to an optical bench based connector, and further in connection with optical connection for photonic circuit boards.

2. Description of Related Art

Photonic integrated circuits (PICs) or integrated optical circuits are part of an emerging technology that uses light as a basis of operation as opposed to an electric current. A PIC device integrates multiple (at least two) photonic functions and as such is analogous to an electronic integrated circuit. The major difference between the two is that a photonic integrated circuit provides functionality for information signals imposed on optical wavelengths typically in the visible spectrum or near infrared 850 nm-1650 nm.

PICs are used for various applications in telecommunications, instrumentation, and signal-processing fields. A PIC device (in the form of a photonic chip package) typically uses optical waveguides to implement and/or interconnect various on-chip elements, such as waveguides, optical switches, couplers, routers, splitters, multiplexers/demultiplexers, modulators, amplifiers, wavelength converters, optical-to-electrical (O/E) and electrical-to-optical (E/O) signal converters (e.g., photodiodes, lasers), etc. A waveguide in a PIC device is usually an on-chip solid light conductor that guides light due to an index-of-refraction contrast between the waveguide's core and cladding.

It is often necessary for PIC devices to have optical connections to other PIC devices, often in the form an organized network of optical signal communication. The connection distances may range from a several millimeters in the case of chip-to-chip communications up to many kilometers in case of long-reach applications. Optical fibers can provide an effective connection method since the light can flow within the optical fibers at very high data rates (>25 Gbps) over long distances due to low-loss optical fibers. For proper operation, a PIC device needs to efficiently couple light between an external optical fiber and one or more on-chip waveguides. An advantage of using light as a basis of circuit operation in a PIC device is that its energy cost for high-speed signal transmission is substantially less than that of electronic chips. Thus, efficient coupling between PIC devices and other optical devices, such as optical fibers, that maintains this advantage is an important aspect of PICs.

The current state-of-the-art attempts to achieve stringent alignment tolerances use polymer connector components, but polymers have several fundamental disadvantages. First, they are elastically compliant so that they deform easily under external applied loads. Second, they are not dimensionally stable and can change size and shape especially when subjected to elevated temperatures such as those found in computing and networking hardware. Third, the coefficient of thermal expansion (CTE) of polymers is much larger than the CTE of materials that are commonly used in PIC devices. Therefore, temperature cycles cause misalignment between the optical fibers and the optical elements on the PIC devices. In some cases, the polymers cannot withstand the processing temperatures used while soldering PIC devices onto printed circuit boards.

One approach to coupling optical fibers to a PIC device (or a PIC chip package) is to attach an optical fiber array directly to the PIC chip. Heretofore, an optical fiber array is aligned to the optical elements on the PIC using an active alignment approach in which the position and orientation of the optical fiber array is adjusted by machinery until the amount of light transferred between the optical fibers and the PIC is maximized. Once the connection is made, it is permanent, and would not be demountable, separable or detachable without likely destroying the integrity of connection and any hope of remounting the optical fibers to the PIC chip. In other words, optical fiber is not removably attachable to the PIC device, and the fiber connection, and separation would be destructive and not reversible (i.e., not reconnectable).

What is needed is an improved approach to accurately couple optical connectors, which improves tolerance, manufacturability, ease of use, functionality and reliability at reduced costs.

SUMMARY OF THE INVENTION

The present invention overcomes the drawbacks of the prior art by providing a demountable/separable and reconnectable connection between an optical connector and an optical bench. An alignment coupler is provided to facilitate active alignment of the optical bench to the optical connector. The optical bench and the coupler together form an optical bench based connector. The optical connector may be at a termination of an optical fiber array having another termination at another end coupled to a photonic apparatus, and the coupler for the optical bench is at a termination of another optical fiber array having another termination at another end coupled to an external connection point, or vice versa between the connector and the coupler.

The connector may be provided with at least one of (a) an edge of a photonic circuit board, (b) a top of the photonic circuit board, (c) an edge of a support of the photonic circuit board, and (d) a top of the support of the photonic circuit board. The optical bench with the coupler can be coupled to the connector as located. Alternatively, the optical bench with the coupler may be provided with at least one of (a) an edge of the photonic circuit board, (b) a top of the photonic circuit board; (c) an edge of a support of the photonic circuit board; and (d) a top of the support of the photonic circuit board. The connector can be coupled to the optical bench and coupler as located.

One aspect of the present invention provides for a method of demountable connection of an optical connector (with or without an optical bench) and an optical bench based connector, comprising: providing a coupler, wherein the coupler has an opening sized to receive an optical bench with clearance for relative movement between the optical bench and the coupler to facilitate alignment, and wherein the coupler is provided with a passive alignment structure structured to demountably couple to the connector; demountably coupling the coupler to the connector; placing the optical bench in the opening of the coupler; actively aligning the optical path between the optical bench and the connector to reach a desired optical alignment between the optical bench and the connector, by adjusting a position of the optical bench within the clearance of the opening of the coupler; fixing the position of the optical bench relative to the coupler at the desired optical alignment, whereby the optical bench is optically aligned to the connector using the coupler, thereby allowing subsequent demountable coupling of the optical bench to the connector by demountable coupling of the coupler. The position of the optical bench relative to the coupler may be fixed at the desired optical alignment by, e.g., epoxy, soldering and welding.

The opening in the coupler is sized and configured to receive at least a portion of the optical bench, with sufficient clearance for anticipated adjustment of the location of the optical bench to achieve the desired optical alignment. The opening may be in the form of a trench, a through hole, a partial hole, a channel. In one embodiment, the coupler may be shaped like a horseshoe (i.e., U-shaped) to surround at least part of the sides of the optical bench. In one embodiment, the optical bench comprises: a base; an array of mirrors defined on the base, wherein each mirror corresponds to an optical fiber in the array, and wherein each mirror includes a structured reflective surface profile that turns light between a first light path along a first direction in a plane substantially parallel to a top surface of the base and a second light path along a second direction outside the plane; an array of grooves each receiving a section of an optical fiber optically aligned with a corresponding mirror along the first light path. In one embodiment, the connector holds end sections of an array of optical fibers, wherein actively aligning the optical path between the optical bench comprises actively aligning the second light path between corresponding mirrors and optical fibers to reach the desired optical alignment between the optical bench and the connector.

The base of the optical bench may be made of metal, and the grooves and the first array of mirrors are integrally defined on the base by stamping a malleable metal material, in accordance with one embodiment. The structured reflective surface profile of the mirrors is configured to reshape light to match mode field of the optical fibers in the optical bench to the optical fibers in the connector. In one embodiment, the structured reflective surface profile or the mirrors comprises one of the following profiles: (a) ellipsoidal, (b) off-axis parabolic, or (c) other free-form optical surfaces.

In one embodiment, the connector is an expanded beam connector configured to receive and output collimated light beams, and wherein the structured reflective surface profile of each mirror is shaped to expand and collimate an incident light beam from a corresponding optical fiber in the optical bench, and in reverse to focus a collimated light beam received from expanded beam connector to the corresponding optical fiber in the optical bench.

In one embodiment, with the connector coupled to the coupler, the connector comprises a structure to support the optical fibers of the connector to input/output light in the second direction along the second light path, wherein light between the optical fibers of the connector and the optical bench follows a light path defined by the first light path and the second light path via the first array of mirrors in the optical bench. The coupler and the optical bench may thus form a demountable right-angle connector.

The connector has a surface facing a surface of the coupler when the coupler is coupled to the connector. The endface of the connector may be polished on an angle (typically 8 degrees) to prevent back-reflections, and then the surface of the coupler is similarly angled to conform with the angle on the endface of the connector.

The connector comprises a passive alignment structure complementary to the passive alignment structure on the coupler, and wherein the connector is demountably coupled to the coupler by passive alignment based on the complementary passive alignment structures on the connector and the coupler, to optically couple the connector with the optical bench via the coupler. In one embodiment, the passive alignment structure on the coupler comprises at least one of alignment pins, alignment pin holes and surface features to provide a kinematic coupling, a quasi-kinematic coupling or an elastic averaging coupling, and wherein the passive alignment structure on the connector comprises at least one of alignment pin holes, alignment pins and surface features to provide a kinematic coupling, a quasi-kinematic coupling and an elastic averaging coupling, complementary to the corresponding passive alignment structure of the coupler.

In another aspect, a demountable right-angle connector can be formed by aligning an optical bench to the connector via the coupler, wherein the position of the optical bench relative to the coupler is fixed in accordance with the above described method.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference letters and/or numerals designate like or similar parts throughout the drawings.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention overcomes the drawbacks of the prior art by providing a demountable/separable and reconnectable connection between an optical connector C and an optical bench OB using an alignment coupler A to facilitate active alignment of the optical bench OB to the optical connector C.

Figure 1A:
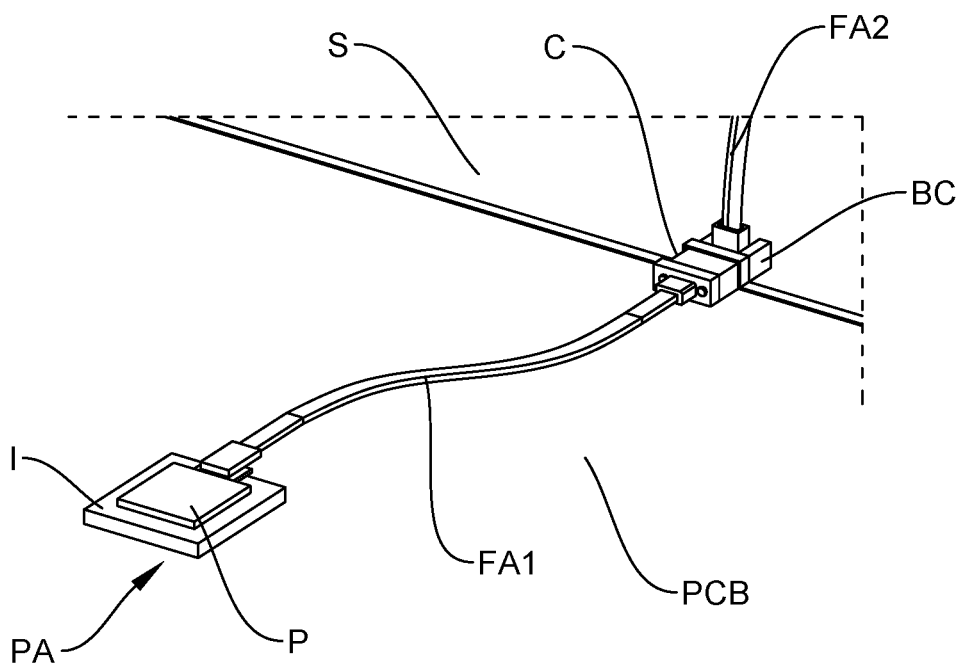
FIG. 1A schematically illustrates a right angle connector at an edge of a circuit board supporting a PIC chip in accordance with one embodiment of the present invention.
Figure 1B:
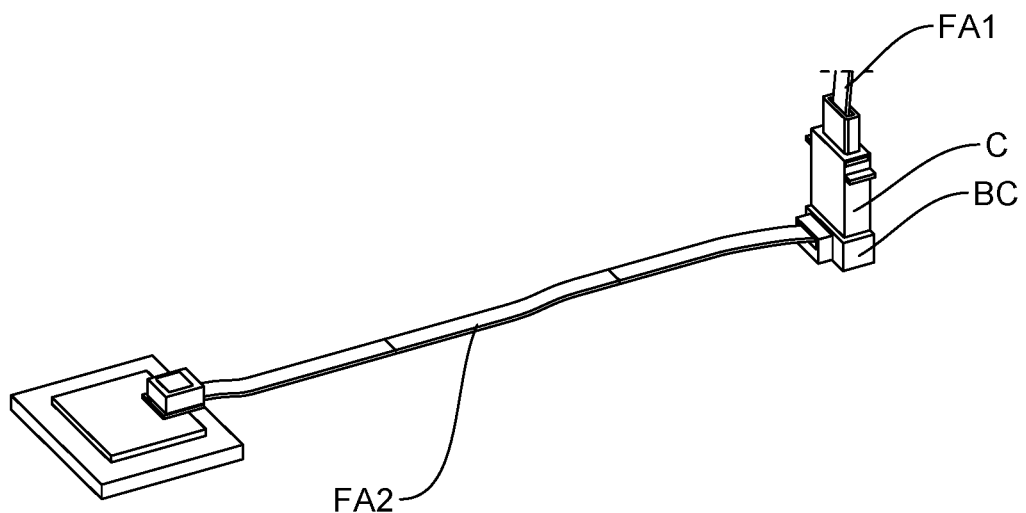
FIG. 1B schematically illustrates a right angle connector on top of a circuit board supporting a PIC chip in accordance with one embodiment of the present invention.

Referring to FIGS. 1A and 1B, the optical bench and the coupler together form an optical bench based connector BC. In FIG. 1A, the connector C may be at a termination of an optical fiber array FA1 having another termination at another end coupled to a photonic apparatus PA (e.g., a photonic integrated circuit (PIC) P supported on a interposer I, supported on a supporting photonic circuit board PCB and a backplane support S), and the connector BC may be at a termination of another optical fiber array FA2 having another termination at another end coupled to an external connection point (not shown in FIG. 1A). In FIG. 1B, the roles of the connector BC and the connector C are switched. In FIG. 1B, the connector BC may be at a termination of an optical fiber array FA2 having another termination at another end coupled to the photonic apparatus PA (e.g., a photonic integrated circuit (PIC), and the connector O may be at a termination of another optical fiber array FA1 having another termination at another end coupled to an external connection point (not shown in FIG. 1B).

As shown in FIGS. 1A and 1B, the connector C and the connector BC may be provided with at least one of (a) an edge of the photonic circuit board PCB (FIG. 1A), (b) a top of the photonic circuit board PCB (FIG. 1B), (c) an edge of a backplane support S of the photonic circuit board PCB (not shown), and (d) a top of the backplane support S of the photonic circuit board (not shown). The optical bench OB can be coupled to the connector C as located.

One aspect of the present invention provides for a method of demountable connection of an optical connector C (with or without an optical bench) and an optical bench based connector BC. Referring to the embodiments of FIGS. 2 and 3, the connector BC includes an optical bench OB and an alignment coupler A. (Given the two embodiments share significant common features, the coupler A1 and connector C1 in FIG. 2 and the coupler A2 and connector C2 in FIG. 3 may be collectively referred to herein as coupler A and connector C when referring to features common to these embodiments.)

Figure 2A:
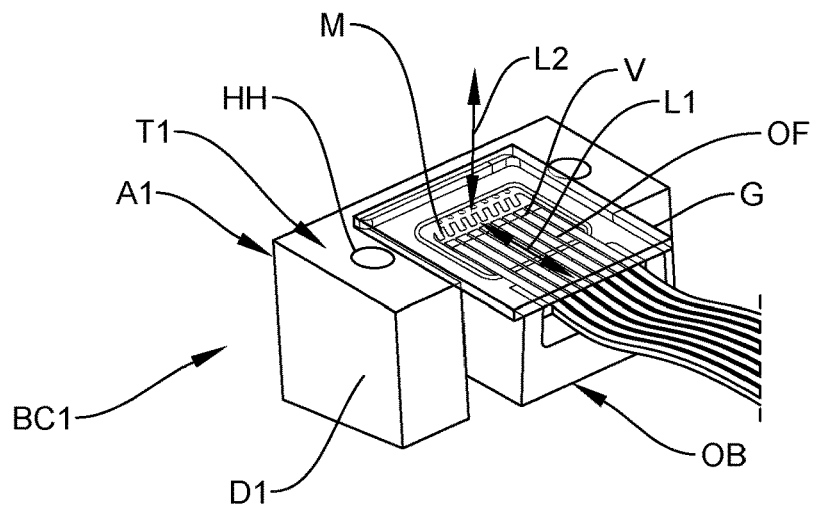
FIGS. 2A and 2B illustrate a right-angle connector comprising a coupler and an optical bench in accordance with one embodiment of the present invention.
Figures 2C, 2D:
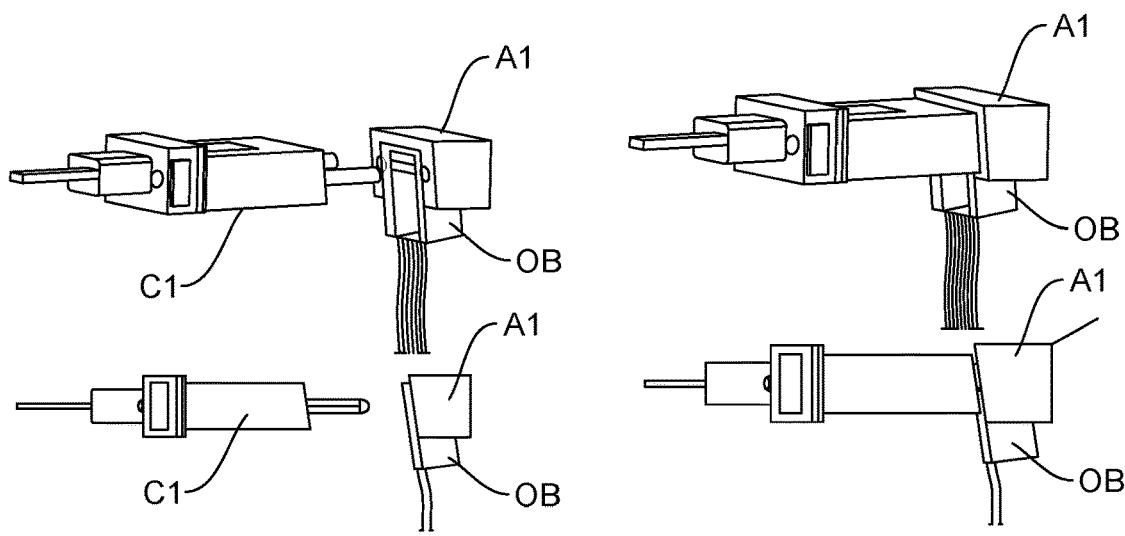
FIGS. 2C to 2F illustrate coupling of the right-angle connector and an optical connector, in accordance with one embodiment of the present invention.
Figure 2E:
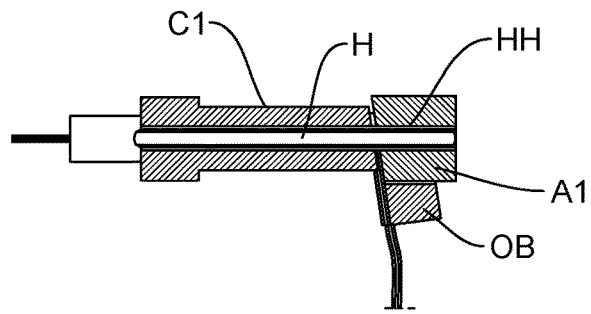
Figure 3A:
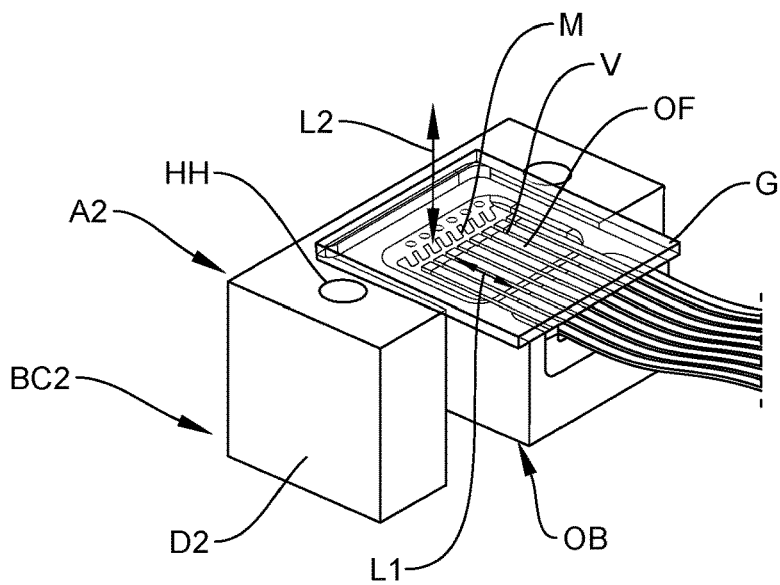
FIGS. 3A and 3B illustrate a right-angle connector comprising a coupler and an optical bench in accordance with one embodiment of the present invention.
Figure 3C:
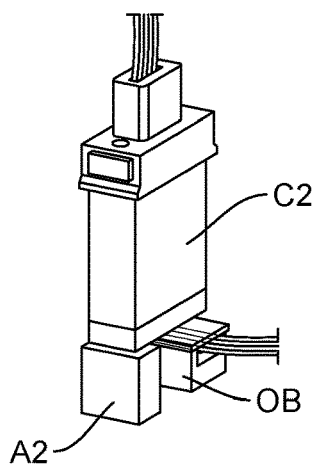
FIGS. 3C to 3F illustrate coupling of the right-angle connector and an optical connector, in accordance with one embodiment of the present invention.
Figure 3D:
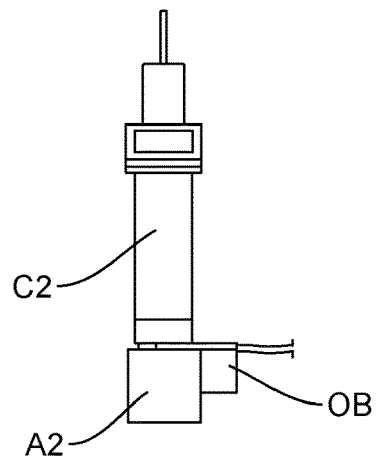
Figure 3E:
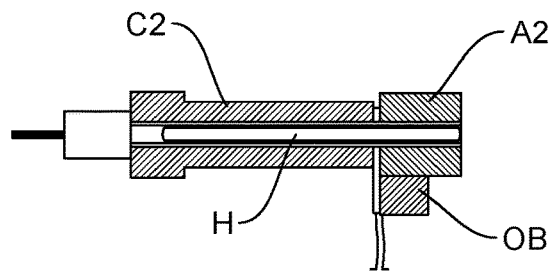
Figure 2B:
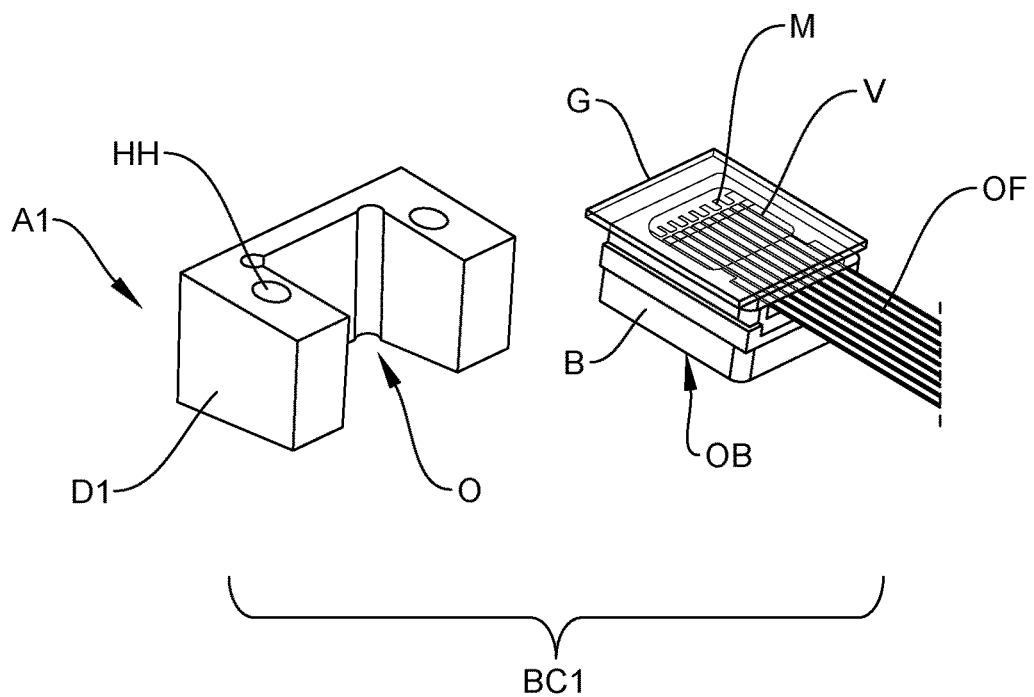
Figure 3B:
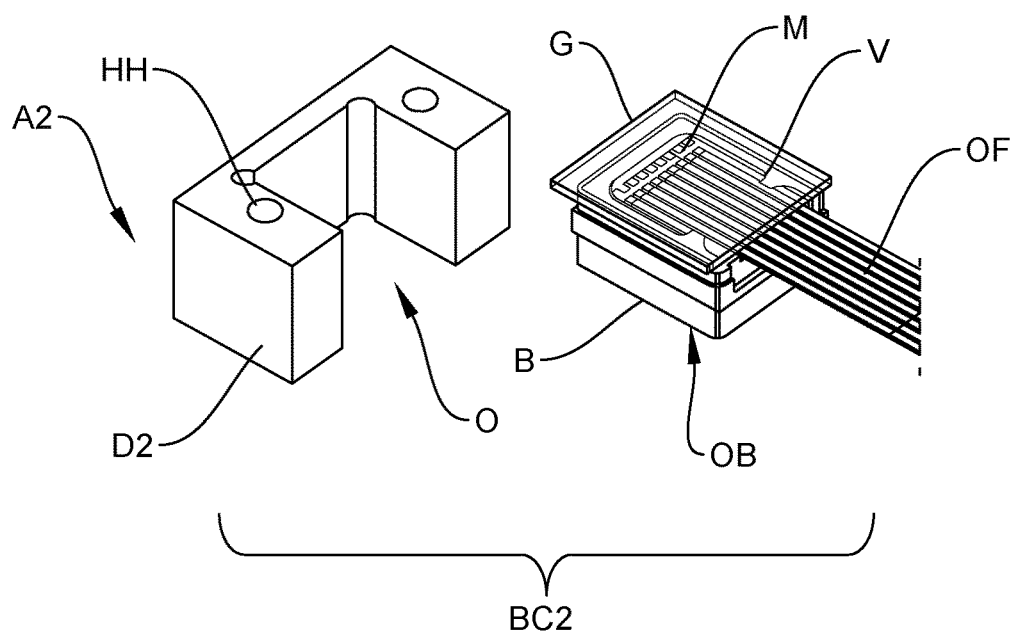

Referring to FIGS. 2A and 2B, the coupler A1 includes a body D having an opening O sized to receive an optical bench OB with clearance for relative movement between the optical bench OB and the coupler A1 (e.g., movements in three translations and three rotations within the opening O) to facilitate alignment. In this regard, the opening in the coupler A1 is sized and configured to receive at least a portion of the optical bench OB, with sufficient clearance for anticipated adjustment of the location of the optical bench OB to achieve the desired optical alignment. The clearance in the opening O must be sufficiently large to account for the dimensional variation of the optical bench OB and the coupler C. For example, the opening O should allow sufficient space to account for the maximum material condition of the coupler C, the maximum material condition of the optical bench OB, and the location tolerances of the fibers within the optical bench OB and coupler C. The opening O may be in the form of a trench, a through hole, a partial hole, or a channel. In the illustrated embodiment, the body D of coupler A1 may be shaped like a horseshoe (i.e., U-shaped) to surround part of the lateral sides and the rear side of the optical bench OB. The connector C has a surface facing a surface of the coupler A when the coupler A is coupled to the connector C. In this embodiment (FIG. 2), the top surface T of coupler A1 shown in FIGS. 2A and 2B is slanted at an angle (e.g., by 8 degrees) to match the complementary slanted/angled facing surface of the connector C1 when coupled.

In the embodiment in FIG. 3, the connector C2 is an expanded beam connector configured to receive and output collimated light beams. To accommodate this connector C2, the structured reflective surface profile of each mirror M is shaped to expand and collimate an incident light beam from a corresponding optical fiber OF in the optical bench OB, and in reverse to focus a collimated light beam received from expanded beam connector C2 to the corresponding optical fiber OF in the optical bench OB. In the embodiment shown in FIGS. 3A and 3B, the top surface T2 of the coupler A2 is not slanted/angled. No slant/angle would be needed for expanded beam type ferrule connectors.

In the illustrated embodiment, the optical bench OB comprises a bench or base B (e.g., made of silicon, glass, a malleable metal such as Kovar, Invar, aluminum, stainless steel) and an array of mirrors M defined on the base. Further an array of grooves V are defined on the base B. Each groove V receives an end section of an optical fiber OF to optically aligned with a corresponding mirror along the first light path L1. A transparent glass, quartz, or sapphire plate G covers the exposed surfaces on the base B. In one embodiment, the optical bench OB may be filled with an index-matching epoxy between the mirror surfaces M and the glass plate G. Each mirror M includes a structured reflective surface profile that turns light (e.g., by 90 degrees) between a first light path L1 along a first (horizontal) direction in a plane substantially parallel to the top surface of the base B (or in a direction along the optical axis of the optical fibers OF) and a second light path L2 along a second (vertical) direction outside the plane.

The base B of the optical bench OB may be made of metal, and the surface features (mirrors M and grooves V) may be integrally defined on the base B by stamping a unitary, monolithic block (e.g., a stock metal material or metal blank) of malleable metal material, in accordance with one embodiment. The structured reflective surface profile of the mirrors M may be configured to reshape light to match the mode field of the optical fibers in the optical bench OB to the optical fibers F in the connector C.

In one embodiment, each mirror M is an exposed free surface of the base B (i.e., surface exposed to air, or not internal within the body of the base of the optical bench) having an exposed reflective free side facing a corresponding optical fiber OF on the base B of the optical bench OB. The exposed reflective free side comprises the structured reflective surface profile at which light is directed to and from the corresponding optical fiber OF in the optical bench. Each mirror M bends, reflects and/or reshapes an incident light. Depending on the geometry and shape (e.g., curvature) of the structured reflective surface profile, the mirrors M may collimate, expand, or focus an incident light beam. For example, the structured reflective surface profile may comprise one of the following geometrical shape/profiles: (a) ellipsoidal, (b) off-axis parabolic, or (c) other free-form optical surfaces. For example, the mirror surface, to provide optical power, may have a surface geometrical curvature function of any of the following, individually, or in superposition: ellipsoidal or hyperbolic conic foci, toroidal aspheric surfaces with various number of even or odd aspheric terms, X-Y aspheric curves with various number of even or off terms, Zernike polynomials to various order, and various families of simpler surfaces encompassed by these functions. The surfaces may also be free-form surfaces with no symmetry along any plane or vector.

In all the described embodiments herein, the structured reflective surfaces may be configured to be flat, concave or convex, or a combination of such to structure a compound reflective surface. In one embodiment, the structured reflective surface has a smooth (having a finish resembling a polished finish) mirror surface. It may instead be a textured surface that is reflective. The structured reflective surface may have a uniform surface characteristic, or varying surface characteristics, such as varying degree of smoothness and/or textures across the surface, or a combination of various regions of smooth and textured surfaces making up the structured reflective surface. The structured reflective surface may have a surface profile and/or optical characteristic corresponding to at least one of the following equivalent optical element: mirror, focusing lens, diverging lens, diffraction grating, or a combination of the foregoing. The structure reflective surface may have a compound profile defining more than one region corresponding to a different equivalent optical element (e.g., a central region that is focusing surrounded by an annular region that is diverging). In one embodiment, the structured reflective surface is defined on an opaque material that does not transmit light through the surface.

The mirrors M may be defined on the base B by stamping a malleable metal material. Various malleable metals, stampable with tool steels or tungsten carbide tools, may compose the body of the mirrors, including any 300 or 400 series stainless steel, any composition of Kovar, any precipitation or solution hardened metal, and any alloy of Ag, Al, Au, Cu. At the long wavelengths above 1310 nm, aluminum is highly reflective (>98%) and economically shaped by stamping. The reflective surface of the portion of the metal comprising the mirror may be any of the metals mentioned above, or any coating of highly reflective metal, applied by sputtering, evaporation, or plating process.

U.S. Pat. No. 7,343,770, commonly assigned to the assignee of the present invention, discloses a novel precision stamping system for manufacturing small tolerance parts. Such inventive stamping system can be implemented to produce the structures of edge couplers disclosed herein (including the structures for the optical bench B discussed above, as well as the structures discussed below). These stamping processes involve stamping a malleable bulk metal material (e.g., a metal blank or stock), to form the final surface features at tight (i.e., small) tolerances, including the reflective surfaces having a desired geometry in precise alignment with the other defined surface features. U.S. Patent Application Publication No. US2016/0016218A1, commonly assigned to the assignee of the present invention, further discloses a composite structure including a base having a main portion and an auxiliary portion of dissimilar metallic materials. The base and the auxiliary portion are shaped by stamping. As the auxiliary portion is stamped, it interlocks with the base, and at the same time forming the desired structured features on the auxiliary portion, such as a structured reflective surface, optical fiber alignment feature, etc. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances. The auxiliary portion may include a further composite structure of two dissimilar metallic materials associated with different properties for stamping different structured features. This stamping approach improves on the earlier stamping process in U.S. Pat. No. 7,343,770, in which the bulk material that is subjected to stamping is a homogenous material (e.g., a strip of metal, such as Kovar, aluminum, etc.) The stamping process produces structural features out of the single homogeneous material. Thus, different features would share the properties of the material, which may not be optimized for one or more features. For example, a material that has a property suitable for stamping an alignment feature may not possess a property that is suitable for stamping a reflective surface feature having the best light reflective efficiency to reduce optical signal losses. The disclosed composite structure may be adopted to produce the optical bench OB and/or the couplers A (e.g., in FIGS. 2 and 3) and optical fiber connectors BC having an optical bench OB as disclosed herein.

The body D of the couplers A may be formed by stamping, in a similar fashion as discussed in connection with forming the surface features (grooves V and mirrors M) of the base B in the optical bench OB discussed above.

The structured reflective surface profile of the mirrors M may be configured to reshape the light beam from the optical fiber OF in the optical bench OB to produce a mode field that more closely match the mode field of the optical fibers F in the optical fiber connector C (e.g., a MT ferrule). Further, as further explained below, for a connector C is of the expanded beam type, the mirrors M in the optical bench OB may be configured with a reflective surface profile to expand or collimate the light beams from the optical fibers OF and output to the fibers F in the connector C, e.g., by focusing light beam on the core of the tip/end face of the optical fibers F held in the connector C. This expanded beam coupling configuration would reduce optical alignment tolerance requirement between the mirrors M and the optical fibers held in an expanded-beam optical fiber connector C.

Figure 2F:
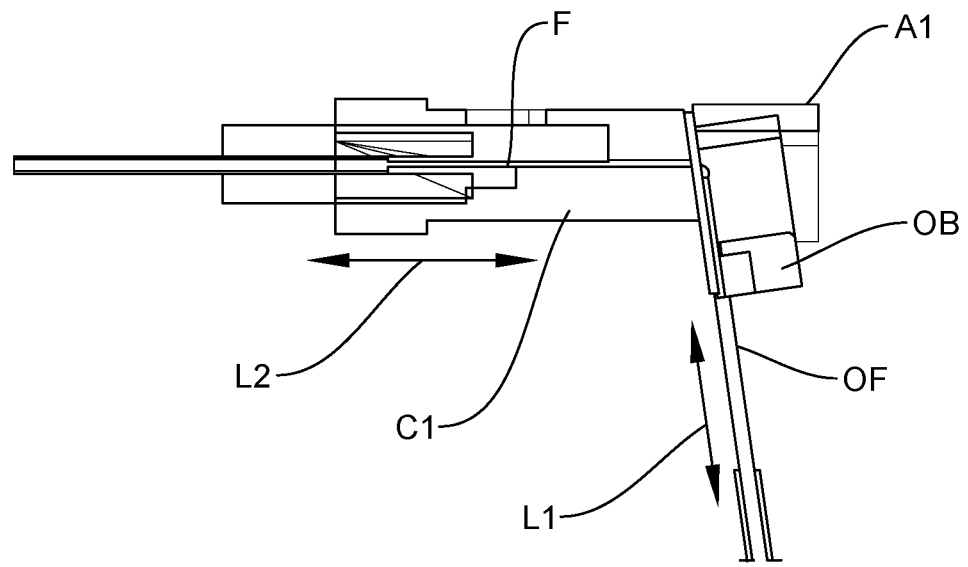
Figure 3F:
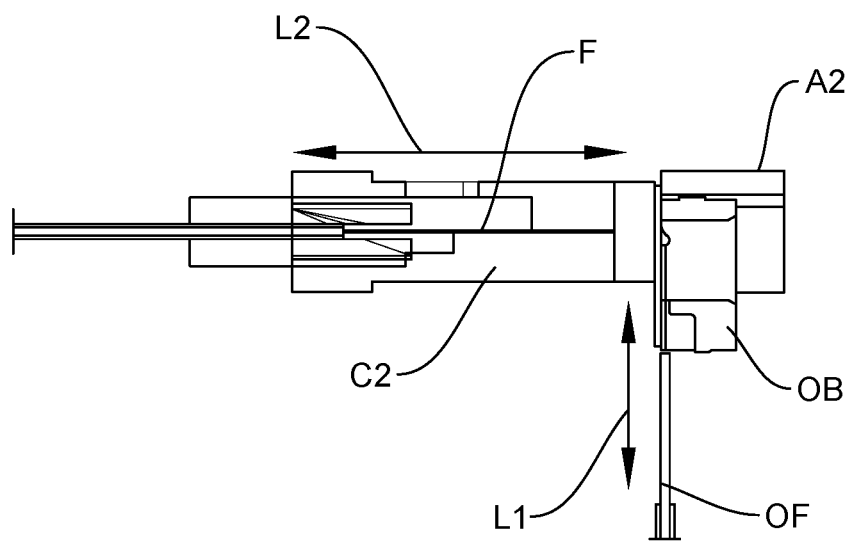

As shown in FIGS. 2F and 3F, the optical fiber array FA1 has a ferrule connector FC without an optical bench (not shown; e.g., an MT ferrule such as used within MTP and MPO fiber-optic connectors) is used to hold optical fibers with exposed bare end faces for coupling to the optical connector BC having the optical bench. In this embodiment, the structured reflective surface profile of the mirrors M can be configured to reshape the light beam from the optical fibers OF to focus the light beams from the optical bench directly to core of the exposed tips/end faces of the optical fibers held in the optical fiber ferrule connector C. The optical fiber connector C comprises a structure to support the optical fibers F to input/output light in the second direction along the second (substantially vertical with respect to the optical fibers OF in the optical bench OB) light path L2, wherein with the optical fiber connector C demountably coupled to the coupler A, light between the optical fiber array FA1 and the optical fibers OF of the optical bench OB follows a light path defined by the first light path L1 and the second light path L2 via the first array of mirrors M in the optical bench OB supported by coupler A.

If the ferrule connector FC is of the expanded-beam type without an optical bench, the structured reflective surface profile of the mirrors M can be configured to reshape the light beams from the PIC chip P to expand the light beams so as to reduce optical alignment tolerance requirement between the mirrors M and the optical fibers held in the expanded-beam optical fiber connector FC. In this embodiment, the tips of the optical fibers OF in the ferrule connector FC need not be, but can be, in physical contact with the glass plate G of the edge coupler E. In this embodiment, the base B of the edge coupler E is provided with alignment holes AA instead of alignment pins A, to accommodate the complementary alignment pins A on the ferrule connector FC.

Various designs or modifications of the reflective surface profile of the mirrors M in the optical bench OB may be made to obtain the desired beam shape/geometry for the desired optical effect.

The connector C comprises a passive alignment structure complementary to the passive alignment structure on the coupler A, and wherein the connector C is demountably coupled to the coupler A by passive alignment based on the complementary passive alignment structures H and HH on the connector and the coupler, respectively, to optically couple the connector C with the optical bench OB via the coupler A. In one embodiment, the passive alignment structure on the coupler A comprises at least one of alignment pins H, alignment pin holes HH and surface features (not shown) to provide a kinematic coupling, a quasi-kinematic coupling or an elastic averaging coupling, and wherein the passive alignment structure on the connector comprises at least one of alignment pin holes, alignment pins and surface features to provide a kinematic coupling, a quasi-kinematic coupling and an elastic averaging coupling, complementary to the corresponding passive alignment structure of the coupler.

In one embodiment, the connector C holds end sections of an array of optical fibers F (see, FIG. 2F), wherein actively aligning the optical path between the optical bench OB and the connector C comprises actively aligning the second light path between corresponding mirrors M and optical fibers F in the connector C to reach the desired optical alignment between the optical bench OB and the connector C.

According to the present invention, the method of demountable connection of an optical connector (with or without an optical bench) and an optical bench based connector, comprises the following steps: providing a coupler A, wherein the coupler A has an opening O sized to receive an optical bench OB with clearance for relative movement between the optical bench OB and the coupler A to facilitate alignment, and wherein the coupler A is provided with a passive alignment structure H or HH structured to demountably couple to the connector C; demountably coupling the coupler A to the connector C; placing the optical bench OB in the opening of the coupler A; actively aligning the optical path (L1+L2) between the optical bench OB and the connector C to reach a desired optical alignment between the optical bench OB and the connector C, by adjusting a position of the optical bench OB within the clearance of the opening O of the coupler A; fixing the position of the optical bench OB relative to the coupler A at the desired optical alignment, whereby the optical bench OB is optically aligned to the connector C using the coupler A, thereby allowing subsequent demountable coupling of the optical bench OB to the connector C by demountable coupling of the coupler A. The position of the optical bench OB relative to the coupler A may be fixed at the desired optical alignment by, e.g., epoxy, soldering and laser welding.

Given with the connector C demountably coupled to the coupler A, the connector C comprises a structure to support the optical fibers F of the connector C to input/output light in the second direction along the second light path L2, wherein light between the optical fibers F of the connector C and the optical bench OB follows a light path defined by the first light path and the second light path via the first array of mirrors M in the optical bench, the coupler and the optical bench may thus form a demountable right-angle optical bench based connector BC.

In another aspect, a demountable right-angle connector can be formed by aligning an optical bench to the connector via the coupler, wherein the position of the optical bench relative to the coupler is fixed in accordance with the above described method.

Figure 4:
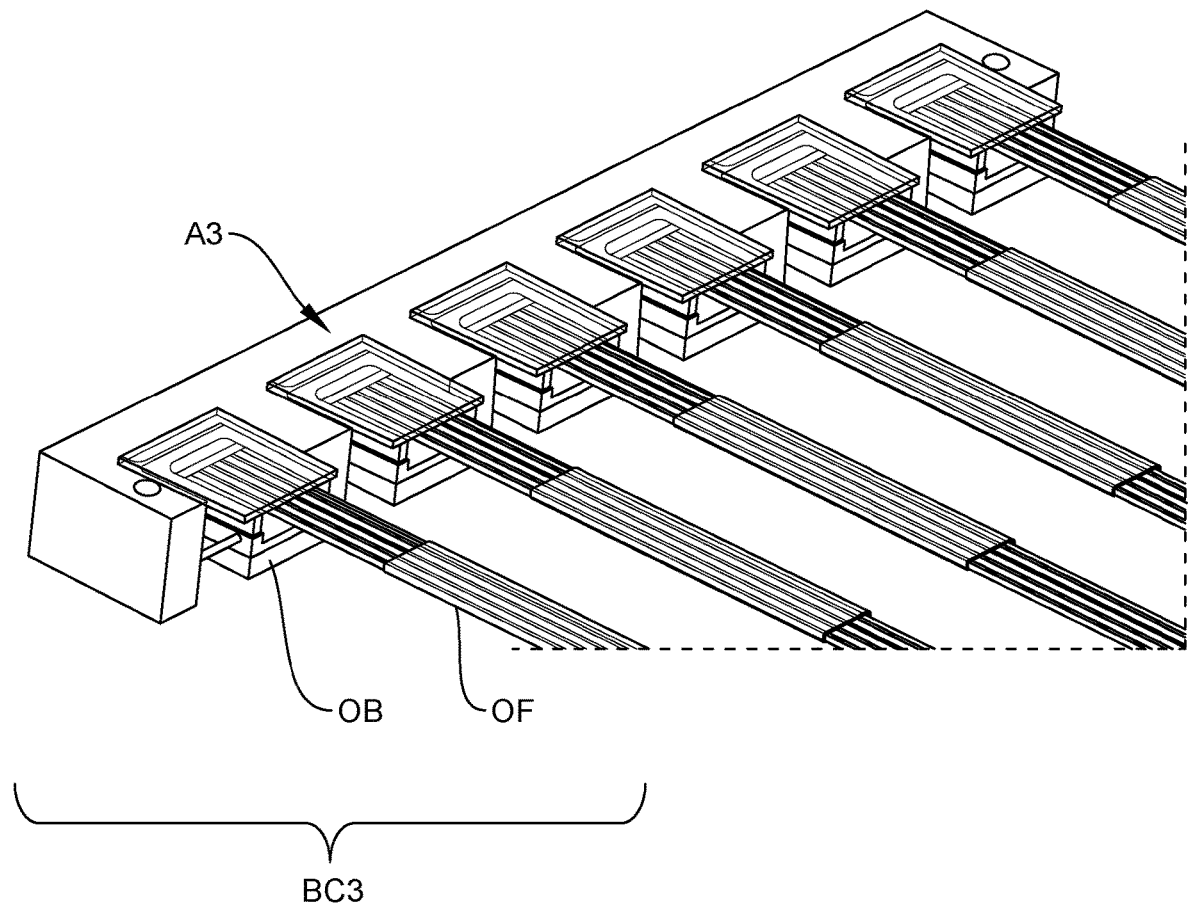
FIG. 4 illustrates a right-angle connector with a coupler supporting multiple optical benches, in accordance with one embodiment of the present invention.

FIG. 4 shows an embodiment of a right angle connector BC3 with a coupler A3 supporting multiple optical benches OB, in accordance with one embodiment of the present invention.

Figure 5A:
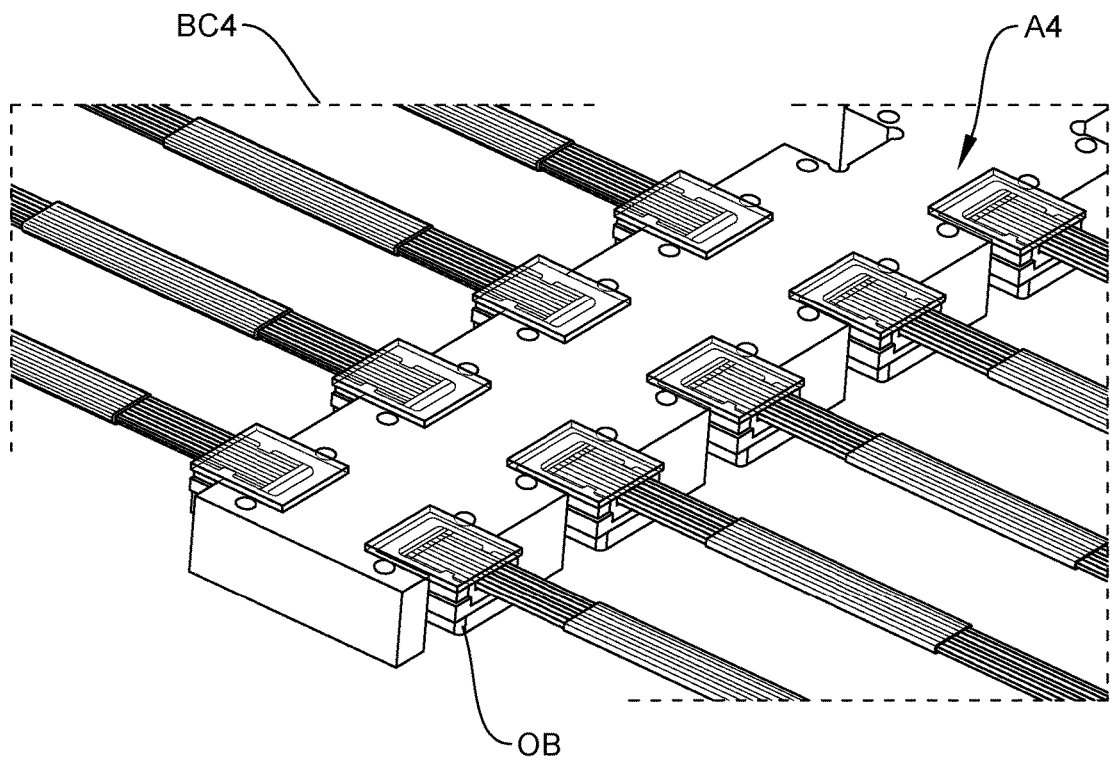
FIG. 5A illustrates a right-angle connector coupler holding multiple optical benches, in accordance with another embodiment of the present invention.
Figure 5B:
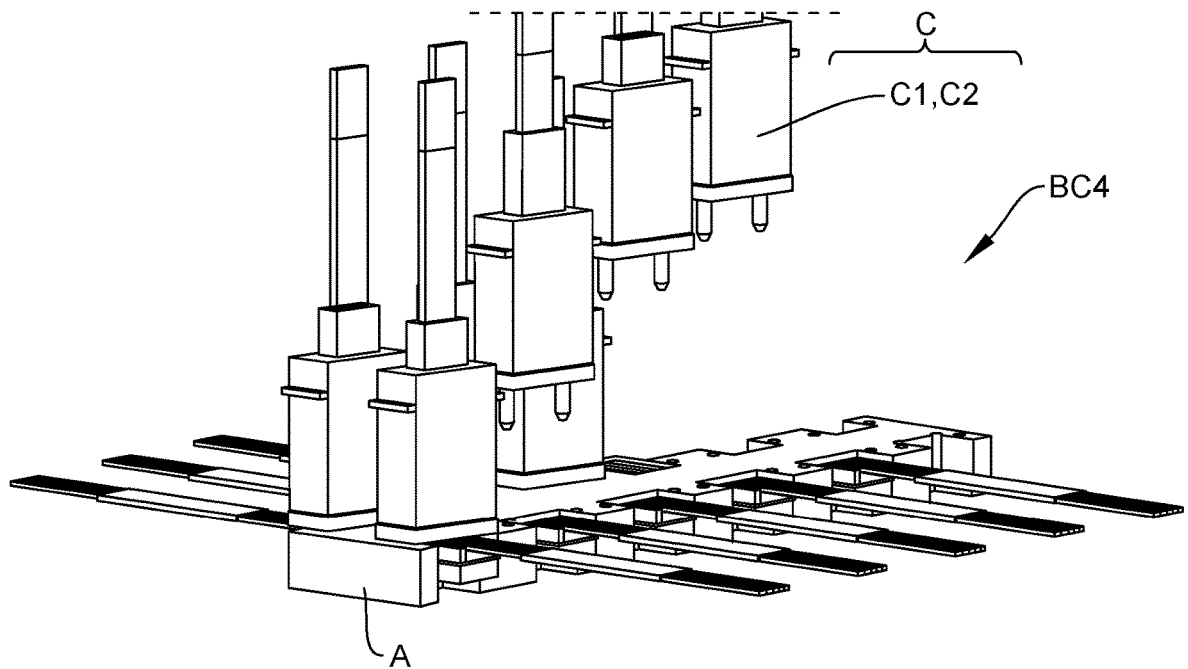
FIG. 5B illustrates coupling of the right angle connector and multiple optical connectors, in accordance with one embodiment of the present invention.

FIG. 5A illustrates another embodiment of a right angle connector BC4 with a coupler A4 holding multiple optical benches OB, in accordance with another embodiment of the present invention; FIG. 5B illustrates coupling of the right angle connector BC4 and multiple optical connectors C, in accordance with one embodiment of the present invention.

The first light path L1 and the second light path L2 for all embodiments discussed above are bi-directional.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A method of demountable connection of an optical connector and an optical bench, comprising:
providing a coupler, wherein the coupler has an opening sized to receive the optical bench with clearance for relative movement between the optical bench and the coupler to facilitate alignment, and wherein the coupler is provided with a passive alignment structure structured to demountably couple to the connector;
demountably coupling the coupler to the connector;
placing the optical bench in the opening of the coupler, wherein the optical bench comprises a base and an array of reflective surfaces defined on the base;
actively aligning the optical path between the optical bench and the connector to reach a desired optical alignment between the optical bench and the connector, by adjusting a position of the optical bench within the clearance of the opening of the coupler;
fixing the position of the optical bench relative to the coupler at the desired optical alignment,
whereby the optical bench is optically aligned to the connector using the coupler, thereby allowing subsequent demountable coupling of the optical bench to the connector by demountable coupling of the coupler.

2. The method of claim 1, wherein the opening in the coupler is sized and configured to receive at least a portion of the optical bench, with sufficient clearance for anticipated adjustment of the location of the optical bench to achieve the desired optical alignment.

3. The method of claim 1, wherein the array of reflective surfaces comprises:
an array of mirrors defined on the base, wherein each mirror includes a structured reflective surface profile that turns light between a first light path along a first direction in a plane substantially parallel to a top surface of the base and a second light path along a second direction outside the plane; and wherein the optical bench further comprising an array of grooves each receiving a section of an optical fiber optically aligned with a corresponding mirror along the first light path.

4. The method of claim 3, wherein the connector holds end sections of an array of optical fibers, wherein actively aligning the optical path between the optical bench comprises actively aligning the second light path between corresponding mirrors and optical fibers to reach the desired optical alignment between the optical bench and the connector.

5. The method of claim 3, wherein the base is made of metal, and the grooves and the first array of mirrors are integrally defined on the base by stamping a malleable metal material.

6. The method of claim 3, wherein the structured reflective surface profile of the mirrors is configured to reshape light to match mode field of the optical fibers in the optical bench to the optical fibers in the connector.

7. The method of claim 3, wherein the structured reflective surface profile comprises one of the following profiles: (a) ellipsoidal, (b) off-axis parabolic, or (c) other free-form optical surfaces.

8. The method of claim 3, wherein the connector is an expanded beam connector configured to receive and output collimated light beams, and wherein the structured reflective surface profile of each mirror is shaped to expand and collimate an incident light beam from a corresponding optical fiber in the optical bench, and in reverse to focus a collimated light beam received from expanded beam connector to the corresponding optical fiber in the optical bench.

9. The method of claim 3, wherein with the connector coupled to the coupler, the connector comprises a structure supporting the optical fibers of the connector to input/output light in the second direction along the second light path, wherein light between the optical fibers of the connector and the optical bench follows a light path defined by the first light path and the second light path via the first array of mirrors in the optical bench.

10. The method of claim 1, wherein the connector comprises a passive alignment structure complementary to the passive alignment structure on the coupler, and wherein the connector is demountably coupled to the coupler by passive alignment based on the complementary passive alignment structures on the connector and the coupler, to optically couple the connector with the optical bench via the coupler.

11. The method of claim 10, wherein the passive alignment structure on the coupler comprises at least one of alignment pins, alignment pin holes and surface features to provide a kinematic coupling, a quasi-kinematic coupling or an elastic averaging coupling, and wherein the passive alignment structure on the connector comprises at least one of alignment pin holes, alignment pins and surface features to provide a kinematic coupling, a quasi-kinematic coupling and an elastic averaging coupling, complementary to the corresponding passive alignment structure of the coupler.

12. The method of claim 1, wherein the connector is provided at at least one of (a) an edge of a photonic circuit board, (b) a top of the photonic circuit board, (c) an edge of a support of the photonic circuit board, and (d) a top of the support of the photonic circuit board, and wherein the optical bench with the coupler can be coupled to the connector as located.

13. The method of claim 1, wherein the optical bench with the coupler are provided at at least one of (a) an edge of a photonic circuit board, (b) a top of the photonic circuit board; (c) an edge of a support of the photonic circuit board; and (d) a top of the support of the photonic circuit board, and the connector can be coupled to the optical bench and coupler as located.

14. The method of claim 1, wherein the connector has a surface facing a surface of the coupler when the coupler is coupled to the connector, wherein the surface of the connector is angled and the surface of the coupler is angled conforming to angle of the surface of the connector.

15. The method of claim 1, wherein the connector is at a termination of an optical fiber array having another termination coupled to a photonic apparatus and the coupler is at a termination of another optical fiber array having another termination coupled to an external connection point, or vice versa between the connector and the coupler.

16. The method of claim 1, wherein the coupler and the optical bench together form a demountable right-angle connector.

17. The method of claim 1, wherein the position of the optical bench relative to the coupler is fixed at the desired optical alignment by at least one of epoxying, soldering and welding.

18. A demountable right-angle connector comprising: a coupler and an optical bench, wherein the position of the optical bench relative to the coupler is fixed in accordance with the method of claim 1.

19. A demountable right-angle connector comprising:
an optical bench, wherein the optical bench comprises:
a base;
an array of mirrors defined on the base, and wherein each mirror includes a structured reflective surface profile that turns light between a first light path along a first direction in a plane substantially parallel to a top surface of the base and a second light path along a second direction outside the plane; and
an array of grooves each receiving a section of an optical fiber optically aligned with a corresponding mirror along the first light path;
a coupler, wherein the coupler has an opening sized to receive the optical bench with clearance for relative movement between the optical bench and the coupler to facilitate alignment, and wherein the coupler is provided with a passive alignment structure structured to demountably couple to a connector, and
wherein the position of the optical bench relative to the coupler is fixed by a method comprising:
demountably coupling the coupler to the connector;
placing the optical bench in the opening of the coupler;
adjusting a position of the optical bench within the clearance of the opening of the coupler to actively aligning the optical path between the optical bench and the connector to reach a desired optical alignment between the optical bench and the connector;
fixing the position of the optical bench relative to the coupler at the desired optical alignment,
whereby the optical bench is optically aligned to the connector using the coupler, thereby allowing subsequent demountable coupling of the optical bench to the connector by demountable coupling of the coupler.

20. The demountable right-angle connector of claim 19, wherein the structured reflective surface profile of each mirror is shaped to expand and collimate an incident light beam from a corresponding optical fiber in the optical bench, and in reverse to focus a collimated light beam to the corresponding optical fiber in the optical bench.

* * * * *